(12) United States Patent
Wermuth et al.

(10) Patent No.: US 9,008,944 B2
(45) Date of Patent: Apr. 14, 2015

(54) METHOD AND APPARATUS FOR CONTROLLING OPERATION OF AN INTERNAL COMBUSTION ENGINE OPERATING IN HCCI COMBUSTION MODE

(75) Inventors: Nicole Wermuth, Garching Bei Munchen (DE); Paul M. Najt, Bloomfield Hills, MI (US); Orgun A. Guralp, Ann Arbor, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1017 days.

(21) Appl. No.: 13/098,550

(22) Filed: May 2, 2011

(65) Prior Publication Data

US 2011/0288742 A1 Nov. 24, 2011

Related U.S. Application Data

(60) Provisional application No. 61/347,798, filed on May 24, 2010.

(51) Int. Cl.
| | | |
|---|---|---|
| *F02D 41/14* | (2006.01) | |
| *F02D 41/26* | (2006.01) | |
| *F02D 35/02* | (2006.01) | |
| *F02D 41/30* | (2006.01) | |
| *F02D 41/00* | (2006.01) | |

(52) U.S. Cl.
CPC .............. *F02D 35/02* (2013.01); *F02D 41/005* (2013.01); *F02D 41/1401* (2013.01); *F02D 41/3035* (2013.01); *F02D 2041/141* (2013.01); *F02D 2200/021* (2013.01); *F02D 2200/0414* (2013.01); *F02D 2200/0418* (2013.01); *F02D 2200/0606* (2013.01); *F02D 2200/703* (2013.01); *Y02T 10/128* (2013.01); *F02D 35/023* (2013.01); *F02D 35/028* (2013.01)

(58) Field of Classification Search
CPC ... F02D 41/005; F02D 41/006; F02D 35/023; F02D 35/028; F02M 25/0752; Y02T 10/128
USPC .................................................. 701/101–106
See application file for complete search history.

(56) References Cited

U.S. PATENT DOCUMENTS

| | | | |
|---|---|---|---|
| 6,662,760 B1 | 12/2003 | Stanglmaier | |
| 7,128,047 B2 | 10/2006 | Kuo et al. | |
| 7,128,063 B2 * | 10/2006 | Kang | ........................ 123/568.14 |

(Continued)

FOREIGN PATENT DOCUMENTS

| | | |
|---|---|---|
| CN | 101223349 A | 7/2008 |
| CN | 101313134 A | 11/2008 |

(Continued)

*Primary Examiner* — Hieu T Vo
*Assistant Examiner* — Arnold Castro

(57) ABSTRACT

An internal combustion engine is configured to operate in a homogeneous-charge compression-ignition combustion mode. Operating the internal combustion engine includes determining an integrated thermal state parameter from an aggregation of engine environment factors. A feed-forward engine control scheme is executed to determine states for engine control parameters. The states for the engine control parameters correspond to a preferred combustion phasing responsive to an operator torque request and the integrated thermal state parameter. Operation of the internal combustion engine is controlled to achieve the preferred combustion phasing using the states for the engine control parameters.

14 Claims, 5 Drawing Sheets

(56) References Cited

U.S. PATENT DOCUMENTS

| | | |
|---|---|---|
| 7,152,559 B2 | 12/2006 | Kuo et al. |
| 7,228,839 B2 | 6/2007 | Kuo et al. |
| 7,246,597 B2 * | 7/2007 | Kuo et al. ............ 123/305 |
| 7,337,762 B2 * | 3/2008 | Eng et al. ............ 123/295 |
| 7,367,308 B2 | 5/2008 | Kuo et al. |
| 7,370,633 B2 | 5/2008 | Kang et al. |
| 7,409,285 B2 | 8/2008 | Kang et al. |
| 7,802,553 B2 | 9/2010 | Najt et al. |
| 8,155,863 B2 * | 4/2012 | Hsu et al. ............ 701/104 |
| 8,210,158 B2 * | 7/2012 | Kang et al. ............ 123/568.19 |
| 2005/0217649 A1 * | 10/2005 | Shimazaki et al. ...... 123/568.14 |
| 2006/0196466 A1 | 9/2006 | Kuo et al. |
| 2006/0243241 A1 | 11/2006 | Kuo et al. |
| 2007/0250256 A1 * | 10/2007 | Kang et al. ............ 701/115 |
| 2007/0272203 A1 * | 11/2007 | Sloane et al. ............ 123/295 |
| 2008/0140300 A1 | 6/2008 | Kuo |
| 2008/0202469 A1 * | 8/2008 | Kang et al. ............ 123/435 |
| 2009/0182485 A1 * | 7/2009 | Loeffler et al. ............ 701/103 |
| 2010/0107605 A1 | 5/2010 | Brinkman et al. |
| 2011/0180035 A1 * | 7/2011 | Durrett ............ 123/295 |

FOREIGN PATENT DOCUMENTS

| | | |
|---|---|---|
| EP | 1920144 B1 | 8/2009 |
| WO | 2008/106278 A1 | 9/2008 |

* cited by examiner

METHOD AND APPARATUS FOR CONTROLLING OPERATION OF AN INTERNAL COMBUSTION ENGINE OPERATING IN HCCI COMBUSTION MODE

CROSS REFERENCE TO RELATED APPLICATIONS

This application claims the benefit of U.S. Provisional Application No. 61/347,798, filed on May 24, 2010, which is incorporated herein by reference.

TECHNICAL FIELD

This disclosure relates to an internal combustion engine configured to operate in a homogeneous-charge compression-ignition (HCCI) combustion mode.

BACKGROUND

The statements in this section merely provide background information related to the present disclosure and may not constitute prior art.

Known spark-ignition (SI) engines introduce an air/fuel mixture into each cylinder that is compressed in a compression stroke and ignited by a spark plug. Known compression-ignition (CI) engines inject pressurized fuel into a combustion cylinder near top dead center (TDC) of the compression stroke that ignites upon injection. Combustion for both SI engines and CI engines involves premixed or diffusion flames controlled by fluid mechanics.

SI engines may operate in a variety of different combustion modes, including a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. The HCCI combustion mode includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich in-cylinder combustion zones that form smoke and particulate emissions.

Engine airflow may be controlled by selectively adjusting position of the throttle valve and opening and closing of intake valves and exhaust valves. On engine systems so equipped, opening and closing of the intake valves and exhaust valves may be adjusted using a variable valve actuation system that includes variable cam phasing and a selectable multi-step valve lift, e.g., multiple-step cam lobes that provide two or more valve lift positions. In contrast to the throttle position change, the change in valve position of the multi-step valve lift mechanism is a discrete step change.

When an engine operates in a HCCI combustion mode, the engine operates at a lean or stoichiometric air/fuel ratio operation with the throttle wide open to minimize engine pumping losses. When the engine operates in the SI combustion mode, the engine operates in stoichiometric air/fuel ratio, with the throttle valve controlled over a range of positions from 0% to 100% of the wide-open position to control intake airflow to achieve the stoichiometric air/fuel ratio.

Combustion during engine operation in the HCCI combustion mode is affected by cylinder charge gas temperature before and during compression prior to ignition and by mixture composition of a cylinder charge. Known engines operating in auto-ignition combustion modes account for variations in ambient and engine operating conditions using calibration tables as part of an overall engine control scheme. Known HCCI engine control schemes include calibrations for controlling engine parameters using input parameters including, e.g., engine load, engine speed and engine coolant temperature. Cylinder charge gas temperatures may be affected by controlling hot gas residuals via engine valve overlap and controlling cold gas residuals via exhaust gas recirculation rate. Cylinder charge gas temperatures may be influenced by engine environment factors, including, e.g., air temperature, humidity, altitude, and fuel parameters, e.g., RVP, energy content, and quality.

Combustion during engine operation in the HCCI combustion mode may be characterized in terms of combustion heat release, which may include combustion timing relative to piston position, i.e., combustion phasing. Combustion phasing may be described in terms of a mass-burn fraction, which indicates a piston crank angle position at which a portion of the mass fraction of a cylinder charge is burned. A mass-burn fraction of interest includes a CA50 point (in crank angle relative to TDC) at which an accumulated heat release of a combustion charge reaches 50% of a total heat release. Known control systems control combustion phasing using feedback control algorithms to compensate for a plurality of effects of environmental and ambient parameters on combustion timing and air/fuel ratio. Alternatively, complex multidimensional calibration tables may be used to account for all the engine environment factors.

SUMMARY

An internal combustion engine is configured to operate in a homogeneous-charge compression-ignition combustion mode. Operating the internal combustion engine includes determining an integrated thermal state parameter from an aggregation of engine environment factors. A feed-forward engine control scheme is executed to determine states for engine control parameters. The states for the engine control parameters correspond to a preferred combustion phasing responsive to an operator torque request and the single integrated thermal state parameter. Operation of the internal combustion engine is controlled to achieve the preferred combustion phasing using the states for the engine control parameters.

BRIEF DESCRIPTION OF THE DRAWINGS

One or more embodiments will now be described, by way of example, with reference to the accompanying drawings, in which.

DETAILED DESCRIPTION

Figure 1:
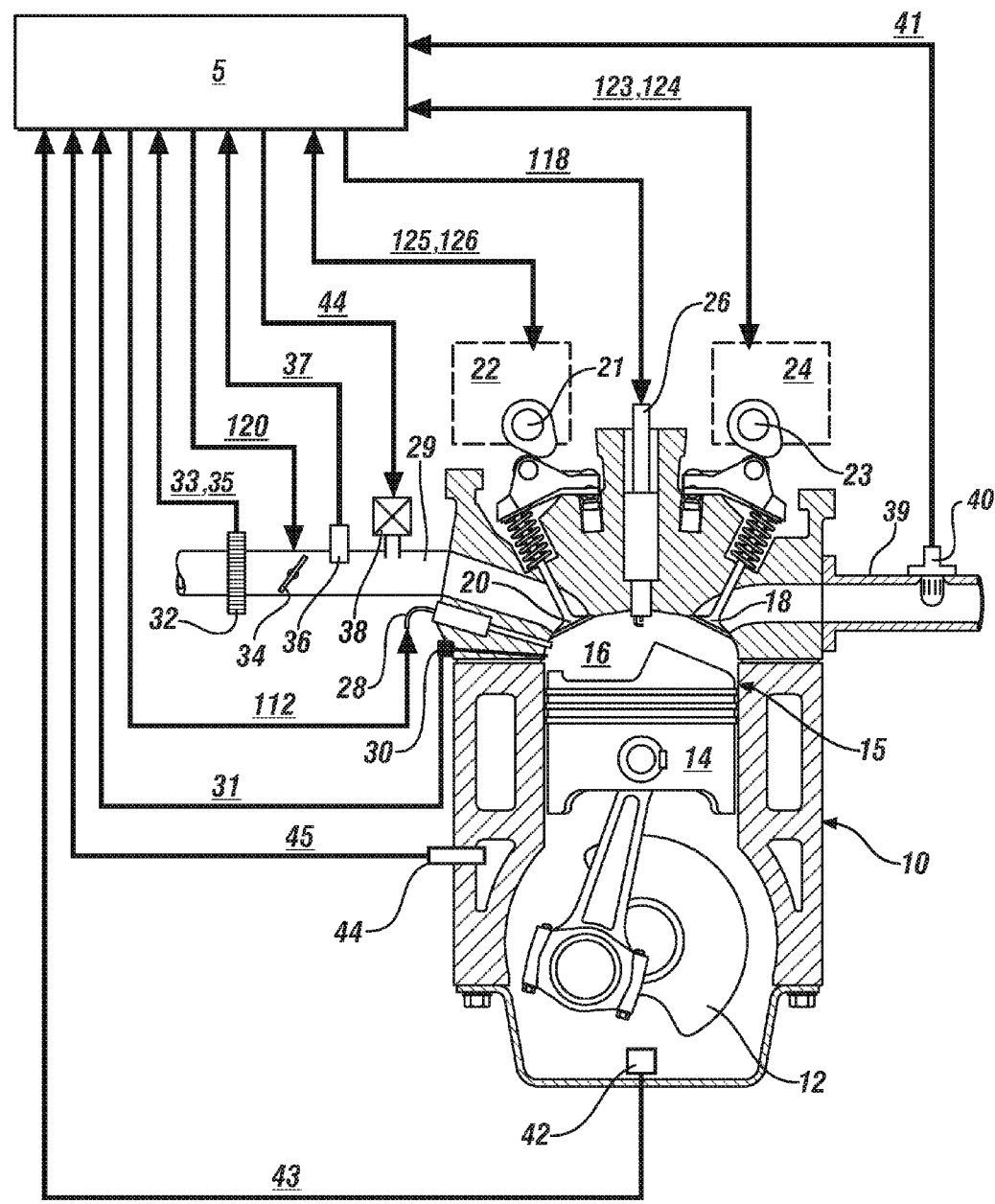
FIG. 1 is a schematic drawing of a spark-ignition internal combustion engine configured to operate in controlled auto-ignition (HCCI) combustion mode and an accompanying control module in accordance with the present disclosure.

Referring now to the drawings, wherein the depictions are for the purpose of illustrating certain exemplary embodiments only and not for the purpose of limiting the same, FIG. 1 is a schematic drawing of an internal combustion engine 10 with an accompanying control module 5 that have been constructed in accordance with an embodiment of this disclosure. The engine 10 is selectively operative in a plurality of combustion modes, including a homogeneous-charge compression-ignition (HCCI) combustion mode and a spark-ignition (SI) combustion mode. The engine 10 is selectively operative at a stoichiometric air/fuel ratio and at an air/fuel ratio that is primarily lean of stoichiometry. The disclosure may be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow (MAF) 33 and intake air temperature (IAT) 35. A throttle valve 34 preferably includes an electronically controlled device that is used to control airflow to the engine 10 in response to a control signal 120 from the control module 5. A pressure sensor 36 in the intake manifold 29 is configured to monitor manifold absolute pressure (MAP) 37 and barometric pressure. An external flow passage recirculates exhaust gases from engine exhaust to the intake manifold 29, having a flow control valve referred to as an exhaust gas recirculation (EGR) valve 38. The control module 5 controls mass flow of exhaust gas to the intake manifold 29 by controlling opening of the EGR valve 38 via control signal 44.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 may be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift (VLC) of the intake valve(s) 20 in response to a control signal 125 and variably adjust and control phasing (VCP) of the intake camshaft 21 for each cylinder 15 in response to a control signal 126. The exhaust VCP/VLC device 24 preferably includes a controllable mechanism operative to variably switch and control valve lift (VLC) of the exhaust valve(s) 18 in response to a control signal 123 and variably adjust and control phasing (VCP) of the exhaust camshaft 23 for each cylinder 15 in response to a control signal 124.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control signals 123, 124, 125, and 126.

The engine 10 employs a direct-injection fuel injection system including a plurality of high-pressure fuel injectors 28 that are configured to directly inject a mass of fuel (INJ_PW) into one of the combustion chambers 16 in response to a control signal 112 from the control module 5. The fuel injectors 28 are supplied pressurized fuel from a fuel distribution system.

The engine 10 includes a spark-ignition system by which spark energy may be provided to a spark plug 26 for igniting or assisting in igniting cylinder charges in each of the combustion chambers 16 in response to a control signal (IGN) 118 from the control module 5.

The engine 10 is equipped with various sensing devices for monitoring engine operation, including a crank sensor 42 having output 43 indicative of crankshaft rotational position, i.e., crank angle and speed (RPM). A temperature sensor 44 is configured to monitor coolant temperature 45. An in-cylinder combustion sensor 30 is configured to monitor combustion 31. The in-cylinder combustion sensor 30 is configured to monitor combustion 31 and is depicted as a cylinder pressure sensor operative to monitor in-cylinder combustion pressure 31 in one embodiment. An exhaust gas sensor 40 is configured to monitor an exhaust gas parameter 41, e.g., air/fuel ratio (AFR). The combustion pressure 31 and the RPM 43 are monitored by the control module 5 to determine combustion phasing, i.e., timing of combustion pressure relative to the crank angle of the crankshaft 12 for each cylinder 15 for each combustion cycle. It is appreciated that combustion phasing may be determined by other methods. The combustion pressure 31 may be monitored by the control module 5 to determine an indicated mean effective pressure (IMEP) for each cylinder 15 for each combustion cycle. Preferably, the engine 10 and control module 5 are configured to monitor and determine states of IMEP for each of the engine cylinders 15 during each cylinder firing event. Alternatively, other sensing systems may be used to monitor states of other combustion parameters within the scope of the disclosure, e.g., ion-sense ignition systems, exhaust gas fractions, and non-intrusive cylinder pressure sensors.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal) to determine an operator torque request, from which an engine torque command is derived.

The control module 5 executes algorithmic code stored therein to control the aforementioned actuators to form a cylinder charge, including controlling throttle position, spark-ignition timing, fuel injection mass and timing, EGR valve position to control flow of recirculated exhaust gases, and intake and/or exhaust valve timing and phasing. Valve timing and phasing may include negative valve overlap (NVO) and lift of exhaust valve reopening (in an exhaust re-breathing strategy), and positive valve overlap (PVO).

The control module 5 is configured to execute an engine fuel cutoff event. Engine fuel cutoff may be executed when an operator removes their foot from an accelerator pedal, resulting in vehicle coasting. In response, the engine may still continue to spin, but engine fueling is cutoff to reduce fuel consumption. When the operator subsequent applies pressure to the accelerator pedal, engine fueling is restored, and the engine fires and generates torque.

The control module 5 may control the engine 10 using autostart and autostop on and off during ongoing vehicle operation, and may operate to selectively deactivate a portion of the combustion chambers 15 or a portion of the intake and exhaust valves 20 and 18 through control of fuel and spark and valve deactivation. The control module 5 may control air/fuel ratio based upon feedback from the exhaust gas sensor 40. The control module 5 may control the engine 5 by commanding a fuel cutoff event (FCO), e.g., during a vehicle deceleration event, and subsequently fueling the engine 10 for refiring.

During engine operation in the spark-ignition combustion (SI) mode, the throttle valve 34 is controlled to regulate the air flow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during intake or compression phase of an engine cycle, preferably substantially before TDC. Spark-ignition is preferably discharged at a predetermined time subsequent to the fuel injection when air charge within the cylinder is substantially homogeneous.

The control module 5 transitions engine operation to a preferred combustion mode associated with operating the engine 10 in the HCCI combustion mode or SI combustion mode to increase fuel efficiencies and engine stability, and/or decrease emissions. A change in one of the engine parameters, e.g., speed or load, may effect a change in an engine operating zone. The control module 5 commands a change in the preferred combustion mode associated with a change in the engine operating zone.

When the engine 10 is operating in the HCCI combustion mode, combustion and combustion timing may be described in context of combustion heat release during a cylinder event, e.g., a magnitude and timing of combustion heat release during cylinder events. The magnitude and timing of the combustion heat release may be indicated by cylinder pressure, a mass-burn fraction or other parameters.

When the engine 10 operates in the HCCI combustion mode, there is a preferred combustion timing that corresponds to an operator torque request and a present engine operating point, which is defined as an engine speed/load point. The preferred combustion timing is affected by combustion temperature. A single integrated thermal state parameter, referred to herein as an effective temperature $T_{EFF}$, may be used to account for a plurality of engine environment factors affecting the combustion temperature and thus affecting the combustion timing during operation in the HCCI combustion mode. The engine environment factors affect operation of the engine 10 when operating in the HCCI combustion mode by influencing temperature of a cylinder charge. The effective temperature $T_{EFF}$ provides a single parameter that accounts for the engine environment factors and thus reduces complexity of HCCI engine calibration and control schemes.

Determining the effective temperature $T_{EFF}$ includes determining and aggregating engine environment factors in terms of their effect upon combustion, e.g., the magnitude and timing of combustion heat release during each cylinder event. Exemplary engine environment factors may include coolant temperature, engine load history, ambient air humidity, altitude, fuel quality, and combustion chamber deposits. The effects of the engine environment factors may be correlated to cylinder pressure and the combustion timing, which may be determined from measurements of engine crank angle, cylinder pressure, combustion timing and estimations correlated to or otherwise ascertained from engine operation.

The effective temperature $T_{EFF}$ is preferably used to adjust control states of engine actuators in a feed-forward approach using a single set of calibration tables, wherein each of the calibration tables is preferably arranged as a two-dimensional array corresponding to engine speed and load. This avoids the use of complex calibration tables and the need for multiple term feedback combustion control. The contribution of each parameter on the effective temperature $T_{EFF}$ is determined and the calibration is based upon the effective temperature $T_{EFF}$ instead of a single one of the parameters, e.g., the coolant temperature.

The single integrated thermal state parameter, i.e., the effective temperature $T_{EFF}$ is an aggregation of engine environment factors affecting combustion. A single state for the effective temperature $T_{EFF}$ may be aggregated using an equation that may be executed during ongoing engine operation. An exemplary equation is set forth as follows.

$$T_{EFF}=T_C+T_{LOAD}+T_{INT}+T_{HUM}+T_{ALT}+T_{FUEL}+T_{DEP} \quad [1]$$

The engine environment factors aggregated to determine the effective temperature $T_{EFF}$ include the following.

$T_C$ which is coolant temperature, $T_{LOAD}$ which is a temperature bias term corresponding to engine load and engine load history, $T_{INT}$ which is a temperature bias term corresponding to intake air temperature, $T_{HUM}$ which is a temperature bias term corresponding to ambient humidity, $T_{ALT}$ which is a temperature bias term corresponding to altitude, $T_{FUEL}$ which is a temperature bias term corresponding to fuel quality, and $T_{DEP}$ which is a temperature bias term corresponding to combustion chamber deposits.

It is appreciated that a value for the effective temperature $T_{EFF}$ may instead be determined by multiplying terms corresponding to the engine environment factors.

In one embodiment the temperature bias term corresponding to fuel quality $T_{FUEL}$ correlates to specific heat capacity of the engine fuel, which may be monitored or otherwise determined during ongoing engine operation.

Contributions of the various engine environment factors including coolant temperature, engine load, ambient air humidity, altitude, fuel quality, and combustion chamber deposits may be determined during calibration development exercises.

An exemplary calibration development exercise includes a process wherein all but one of the engine environment factors is set and controlled to nominal states. A selected one of the engine environment factors that is not set is controlled to one of a plurality of states selected from a range of states between a minimum state and a maximum state, and the magnitude and timing of the combustion heat release are determined, e.g., by determining a CA50 mass-burn fraction point at each of the plurality of states. An effect on the combustion heat release is determined, as compared to a preferred magnitude and timing of the combustion heat release for the operating point using Eq. 1. The effect on the combustion heat release is used to calculate temperature bias terms associated with the selected one of the engine environment factors. This process is preferably repeated over a range of engine speed and load operating conditions. Thus, a calibration corresponding to engine speed and load may be developed for the selected one of the engine environment factors. The calibration development exercise is repeated to develop a calibration for each of the engine environment factors associated with the effective temperature $T_{EFF}$ using combinations of all but one of the engine environment factors at known states and systematically controlling a selected one of the engine environment factors across a plurality of discrete steps over an expected operating range. This action permits execution of a straight-forward calibration process for each of the engine environment factors. In operation, an effective temperature $T_{EFF}$ corresponding to the known states of the engine environment factors at each operating point may be determined based thereon.

There is a preferred state for an engine control parameter, e.g., a target combustion phasing, for a combination of engine load, engine speed and the effective temperature $T_{EFF}$.

During ongoing engine operation, a state for the effective temperature $T_{EFF}$ is iteratively determined by measuring or otherwise determining present operating states for each of the engine environment factors and combining them, e.g., as shown with reference to Eq. 1, above.

Figure 2:
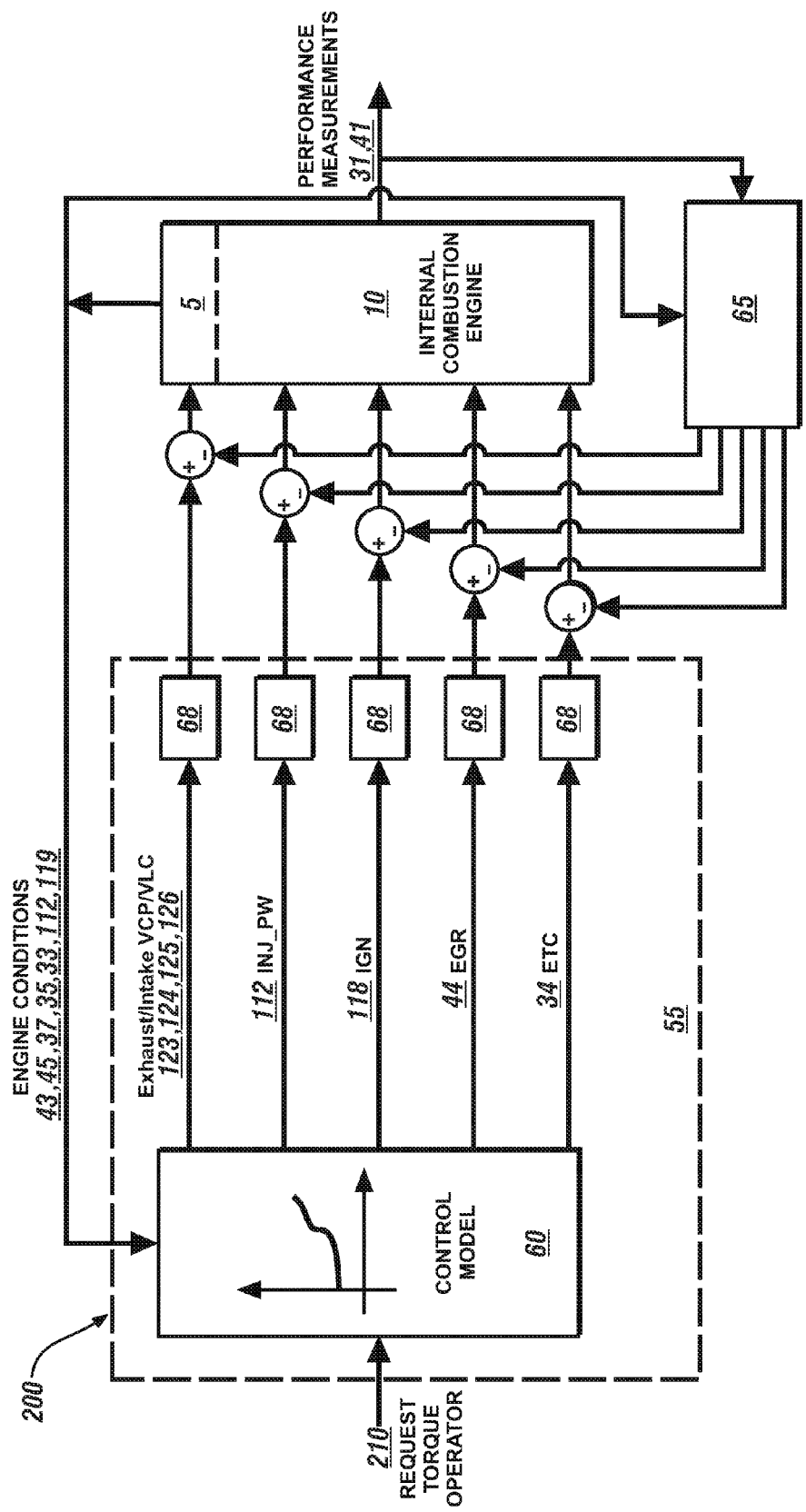
FIG. 2 schematically shows an engine control scheme for controlling and operating the exemplary engine in the HCCI combustion mode in accordance with the disclosure.

During ongoing engine operation, the integrated thermal state parameter is iteratively determined as an aggregation of the engine environment factors. A preferred combustion timing responsive to the operator torque request and the single integrated thermal state parameter may be determined. A feed-forward engine control scheme, e.g., as described with reference to FIG. 2, is executed to determine states for engine control parameters. The states for the engine control parameters are used to control operation of the internal combustion engine to achieve the preferred combustion timing while considering the engine environment factors.

FIG. 2 schematically shows an engine control scheme 200 for controlling and operating the exemplary engine 10 in the HCCI combustion mode. The engine control scheme 200 preferably consists of algorithmic code and calibration tables stored in one of the memory devices of the engine control module 5 for execution therein. The engine control scheme 200 synthesizes operator inputs, e.g., an operator torque request 210, ambient conditions including, e.g., IAT 35, engine operating states including coolant temperature 45, RPM 43, MAP 37, MAF 33, and INJ_PW 112, and the monitored engine states associated with combustion performance, including combustion pressure 31 and AFR 41. An effective temperature $T_{EFF}$ 119 is determined, as described with reference to Eq. 1, and accounts for the engine environment factors that influence HCCI engine operation.

The engine control scheme 200 executes algorithms to determine preferred control states for various actuators to meet the operator torque request and achieve targets for engine operation. The monitored engine states associated with combustion performance, including combustion pressure 31 and AFR 41 are preferably translatable to combustion parameters that are measures of combustion phasing and burn duration occurring during engine operation in the controlled auto-ignition combustion. The combustion phasing is preferably the CA50 mass-burn fraction point. The burn duration is defined as the crank angle interval, in crank angle degrees between 10 and 90% mass-burn fraction points.

The engine control scheme 200 includes a feedforward control scheme 55 and a feedback control scheme 65, which are preferably executed as part of ongoing engine control to achieve a rapid and effective system response to changes of operating conditions in response to changes in the operator inputs and ambient conditions.

The feedforward control scheme 55 includes a control model 60, including precalibrated look-up tables and algorithms, and a plurality of rate limiters 68. The precalibrated look-up tables and algorithms of the control model 60 include machine-searchable arrays stored in a memory devices and machine-executable algorithms to determine commands for each of the engine control actuators based upon the engine operating states.

The preferred commands for the engine control actuators include ETC 34, EGR 44, IGN 118, INJ_PW 112, intake VCP/VLC 125/126 and exhaust VCP/VLC 123/124. The preferred engine operating states include, e.g., RPM 43, MAP 37, IAT 35, MAF 33, and INJ_PW 112 and the effective temperature $T_{EFF}$ 119. An engine operating point is determined based upon the engine operating states including speed and load and the effective temperature $T_{EFF}$ 119. A specific feed-forward control state for each of the engine control actuators is determined based upon the engine operating states and the engine power history. The control states for each of the engine control actuators include actuator-appropriate command signals to control operation of the actuators to achieve a target engine operation as indicated by the engine operating point and the monitored engine states associated with combustion performance, including combustion pressure 31 and AFR 41. The feed-forward control states for the engine control actuators are subjected to one of the plurality of feed-forward rate-limiters 68.

The feedback control scheme 65 monitors the aforementioned engine operating states and the monitored engine states associated with combustion performance, including the combustion pressure 31 and AFR 41 to determine adjustments for the control signals of the ETC 34, EGR 44, IGN 118, INJ_PW 112, intake VCP/VLC 125/126 and exhaust VCP/VLC 123/124 using known feedback control strategies. The rate-limited feed-forward control states for the engine control actuators are adjusted using the feedback control scheme 65, and the engine 10 is controlled thereby.

Figure 3:
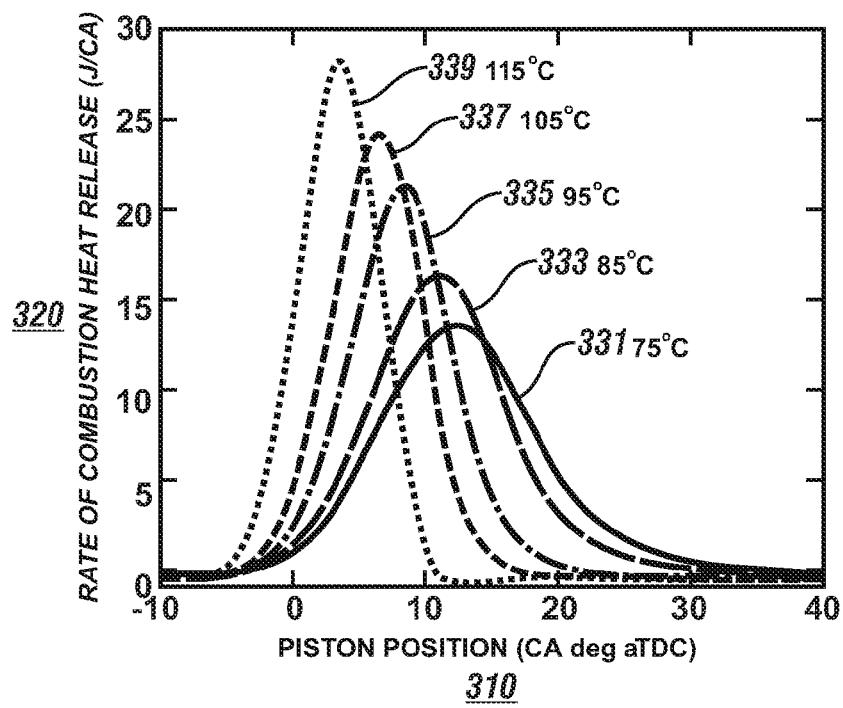
FIG. 3 graphically depicts a rate of combustion heat release plotted against piston position around TDC for a range of intake air temperatures for an exemplary internal combustion engine operating in HCCI combustion mode in accordance with the disclosure.

FIG. 3 graphically depicts a rate of combustion heat release 320 (J/CA) plotted against piston position around TDC 310 (CA deg aTDC) for a range of intake air temperatures, including 75° C. 331, 85° C. 333, 95° C. 335, 105° C. 337, and 115° C. 339 for an exemplary internal combustion engine operating in HCCI combustion mode, indicating an advance in combustion phasing, i.e., movement toward TDC and an increase in peak heat release with increasing intake air temperature.

Figure 4:
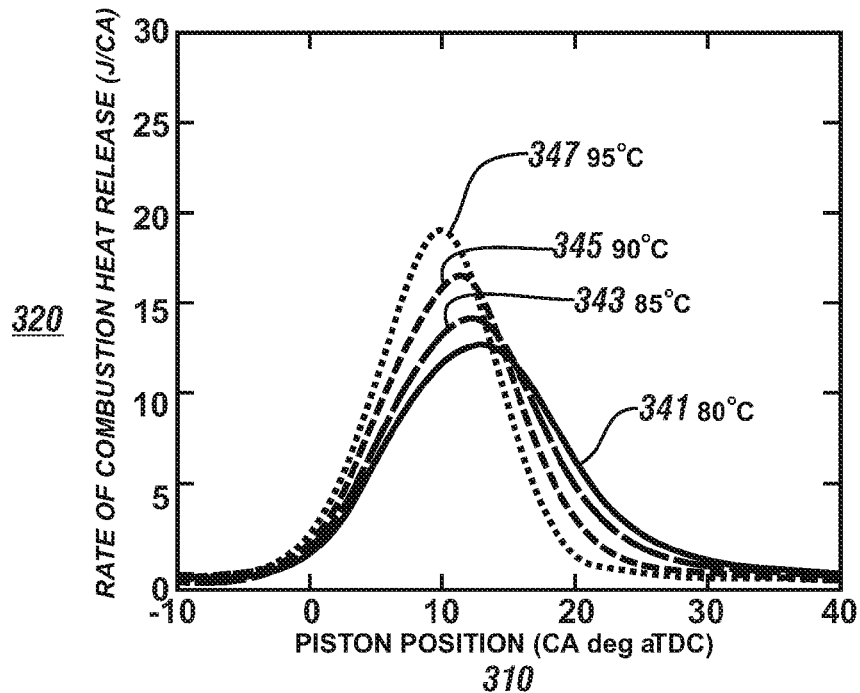
FIG. 4 graphically depicts a rate of combustion heat release plotted against piston position around TDC for a range of coolant temperatures for an exemplary internal combustion engine operating in HCCI combustion mode, in accordance with the disclosure.

FIG. 4 graphically depicts a rate of combustion heat release 320 (J/CA) plotted against piston position around TDC 310 (CA deg aTDC) for a range of coolant temperatures including 80° C. 341, 85° C. 343, 90° C. 345, and 95° C. 347, for an exemplary internal combustion engine operating in HCCI combustion mode, indicating an advance in combustion phasing, i.e., movement toward TDC and increase in peak heat release with increasing coolant temperature.

Figure 5:
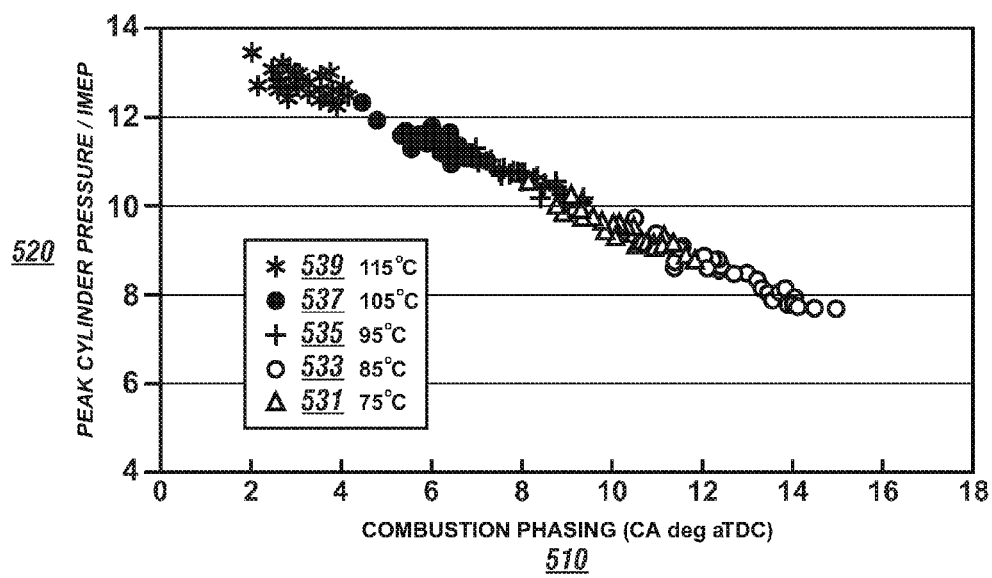
FIG. 5 graphically depicts a ratio of peak cylinder pressure in relation to indicated mean effective pressure (IMEP) plotted in relation to combustion phasing, i.e., CA50 mass-burn fraction points for intake air temperature states for an exemplary internal combustion engine operating in HCCI combustion mode in accordance with the disclosure.

FIG. 5 graphically depicts a ratio of peak cylinder pressure in relation to IMEP 520 plotted in relation to combustion phasing, i.e., CA50 mass-burn fraction 510 (CA deg aTDC) for intake air temperature states including 75° C. 531, 85° C. 533, 95° C. 535, 105° C. 537, and 115° C. 539 for an exemplary internal combustion engine operating in HCCI combustion mode, indicating an advance in combustion phasing, i.e., movement toward TDC, and increase in peak cylinder pressure in relation to IMEP with increasing intake air temperature. The data indicates that the contribution of the intake air temperature on the effective temperature $T_{EFF}$ may be determined by evaluating the relationship between the output parameters of combustion performance and combustion phasing and the input parameter of intake air temperature.

Figure 6:
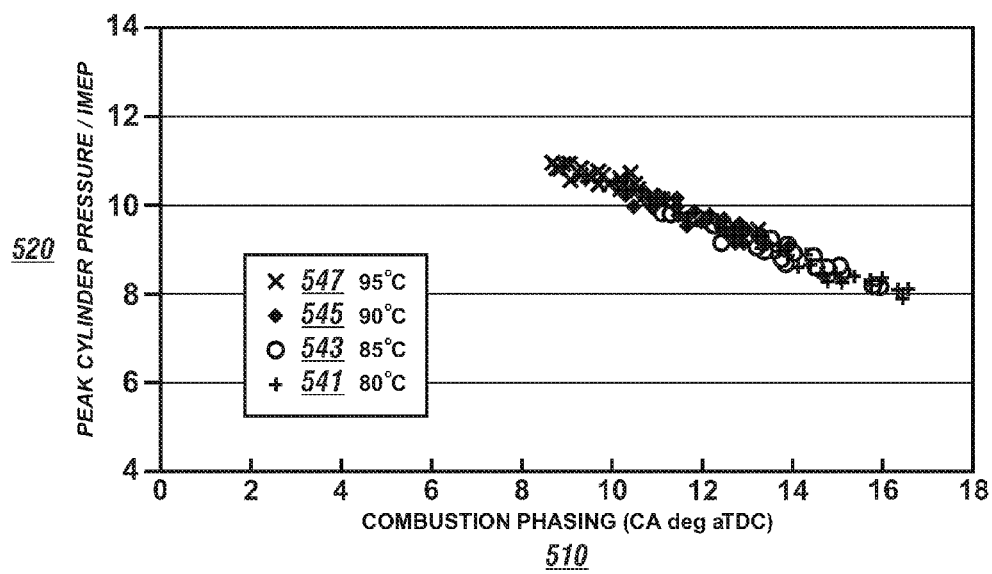
FIG. 6 graphically depicts a ratio of peak cylinder pressure in relation to indicated mean effective pressure (IMEP) plotted in relation to combustion phasing, i.e., CA50 mass-burn fraction points for coolant temperature states for an exemplary internal combustion engine operating in HCCI combustion mode in accordance with the disclosure.

FIG. 6 graphically depicts a ratio of peak cylinder pressure in relation to IMEP 520 plotted in relation to combustion phasing, i.e., CA50 mass-burn fraction 510 (CA deg aTDC) for coolant temperature states including 80° C. 541, 85° C. 543, 90° C. 545, and 95° C. 547, for an exemplary internal combustion engine operating in HCCI combustion mode, indicating an advance in combustion phasing, i.e., movement toward TDC and increase in the ratio of peak cylinder pressure in relation to IMEP with increasing coolant temperature. The contribution of the coolant temperature on the effective temperature $T_{EFF}$ may be determined by evaluating the relationship between the output parameters of combustion performance and combustion phasing and the input parameter of engine coolant temperature.

The results depicted in FIGS. 3, 4, 5 and 6 indicate that the intake air temperature influences combustion phasing in the same way, although not necessarily in the same magnitude, as the coolant temperature. In one embodiment, a change in the intake air temperature has an influence on the heat release rate that is 0.89 times that by a change in the coolant temperature. The intake air temperature may be directly measured to provide a magnitude of the temperature bias term associated with the intake air temperature $T_{INT}$.

Figure 7:
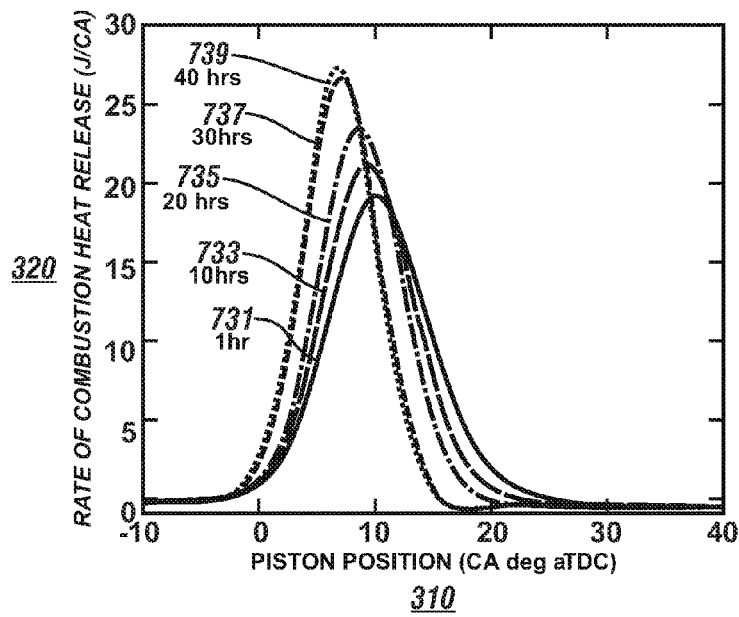
FIG. 7 graphically depicts a rate of combustion heat release plotted against piston position around TDC for engine operation of various durations for an exemplary internal combustion engine operating in HCCI combustion mode in accordance with the disclosure.

FIG. 7 graphically depicts a rate of combustion heat release 320 (J/CA) plotted against piston position around TDC 310 (CA deg aTDC) for engine operating states of 1 hour of operation 731, 10 hours of operation 733, hours of operation 735, 30 hours of operation 737, and 40 hours of operation 739 for an exemplary internal combustion engine operating in HCCI combustion mode, indicating an advance in combustion phasing, i.e., movement toward TDC and an increase in peak heat release with increasing hours of operation, which are associated with combustion chamber deposits.

Figure 8:
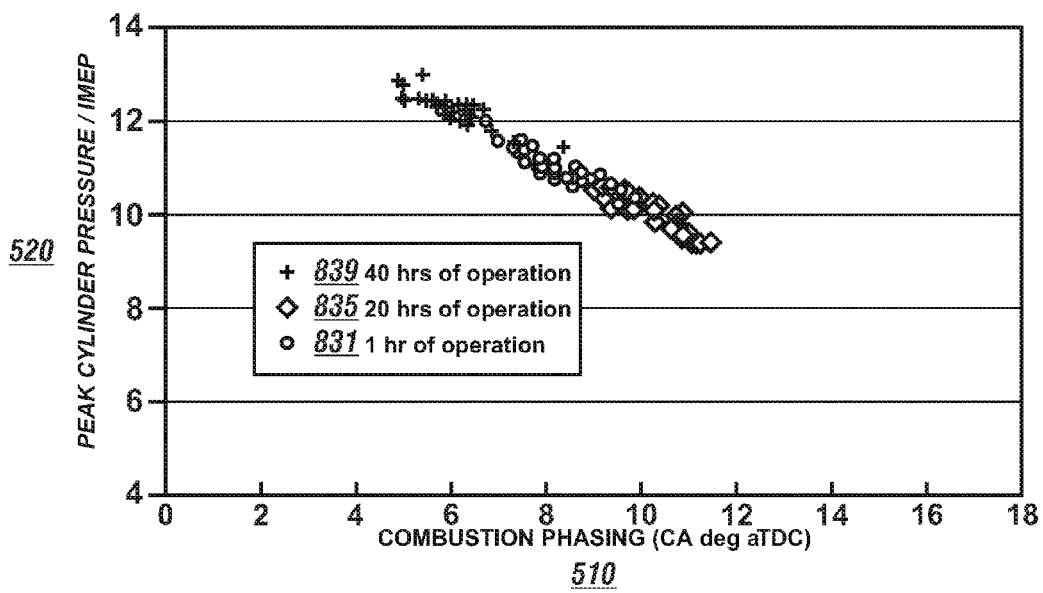
FIG. 8 graphically depicts a ratio of peak cylinder pressure in relation to indicated mean effective pressure (IMEP) plotted in relation to combustion phasing, i.e., CA50 mass-burn fraction points for engine operating states for an exemplary internal combustion engine operating in HCCI combustion mode in accordance with the disclosure.

FIG. 8 graphically depicts a ratio of peak cylinder pressure in relation to indicated mean effective pressure 520 (pressure/pressure) plotted in relation to combustion phasing, i.e., CA50 mass-burn fraction 510 (CA deg aTDC) for engine operating states of 1 hour of operation 831, 20 hours of operation 835, and 40 hours of operation 839 for an exemplary internal combustion engine operating in HCCI combustion mode, indicating an advance in combustion phasing, i.e., movement toward TDC and increase in the ratio of the peak cylinder pressure in relation to the indicated mean effective pressure with increasing hours of operation, which are associated with combustion chamber deposits.

FIGS. 7 and 8 illustrate how a contribution of combustion chamber deposits on the effective temperature may be estimated to determine the temperature bias term associated with combustion chamber deposits, i.e., $T_{DEP}$.

FIGS. 3, 4, 7 and 8 indicate that combustion chamber deposits influence the heat release rate and combustion phasing in the same way, although not necessarily in the same magnitude, as the coolant temperature. In one embodiment, combustion chamber deposits associated with 40 hours of engine operation have an influence on the heat release rate that is equivalent to a change in coolant temperature of 16° C. The hours of engine operation may be directly measured to provide a magnitude of the temperature bias term associated with combustion chamber deposits, i.e., a state for $T_{DEP}$.

It is appreciated that similar evaluations may be developed to determine contributions of the various engine environment factors on the effective temperature $T_{EFF}$.

For the development as well as for the query of the calibration table the effective temperature $T_{EFF}$ takes into account the engine environment factors or any subset of the engine environment factors, including coolant temperature, engine load, intake air temperature, ambient humidity, engine altitude, fuel temperature, and combustion chamber deposits. The effective temperature $T_{EFF}$ may be used in a feed-forward control scheme to avoid marginal engine operation or engine misfire events, including during combustion mode transitions.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating an internal combustion engine in a homogeneous-charge compression-ignition combustion mode, the method comprising:
   determining an integrated thermal state parameter comprising an aggregation of engine environment factors;
   controlling operation of the internal combustion engine in the homogeneous-charge compression-ignition combustion mode to achieve a preferred combustion phasing responsive to an operator torque request and the integrated thermal state parameter, comprising executing a feed-forward engine control scheme to determine states for engine control parameters associated with the preferred combustion phasing responsive to the operator torque request and the integrated thermal state parameter.

2. The method of claim 1, wherein determining the integrated thermal state parameter comprising the aggregation of engine environment factors comprises determining an integrated thermal state parameter comprising an aggregation of engine environment factors affecting a combustion parameter.

3. The method of claim 2, wherein determining the integrated thermal state parameter comprising the aggregation of engine environment factors affecting the combustion parameter comprises determining an integrated thermal state parameter comprising an aggregation of engine environment factors affecting combustion heat release.

4. The method of claim 3, wherein determining the integrated thermal state parameter comprising the aggregation of engine environment factors affecting the combustion heat release comprises determining an integrated thermal state parameter comprising an aggregation of engine environment factors affecting the combustion heat release indicated by a 50% mass-burn fraction.

5. The method of claim 1, wherein executing the feed-forward engine control scheme to determine states for engine control parameters, the states for the engine control parameters corresponding to the preferred combustion phasing responsive to the operator torque request and the single integrated thermal state parameter comprises executing the feed-forward engine control scheme to determine states for engine control parameters including one of fuel injection mass and timing, EGR flowrate, variable cam phasing, and magnitude of a variable cam lift.

6. The method of claim 1, further comprising:
   determining a present combustion phasing correlated to a state of a combustion parameter; and
   executing a feedback control scheme to adjust the states for the engine control parameters in response to the present combustion phasing and the preferred combustion phasing.

7. A method for operating an internal combustion engine, comprising:
   determining an integrated thermal state parameter comprising an aggregation of engine environment factors; and
   controlling operation of the internal combustion engine in a homogeneous-charge compression-ignition combustion mode to achieve a preferred combustion phasing responsive to an operator torque request and the integrated thermal state parameter comprising executing a feed-forward engine control scheme to determine states for engine control parameters associated with the preferred combustion phasing responsive to the operator torque request and the integrated thermal state parameter.

8. The method of claim 7, further comprising:
   determining a present combustion phasing correlated to a combustion parameter; and
   executing a feedback control scheme to adjust the states for the engine control parameters in response to the present combustion phasing and the preferred combustion phasing.

9. The method of claim 7, wherein determining the integrated thermal state parameter comprising the aggregation of engine environment factors comprises determining an integrated thermal state parameter comprising an aggregation of engine environment factors affecting a combustion parameter.

10. The method of claim 9, wherein determining the integrated thermal state parameter comprising the aggregation of engine environment factors affecting the combustion parameter comprises determining an integrated thermal state parameter comprising an aggregation of engine environment factors affecting combustion heat release.

11. The method of claim 10, wherein determining the integrated thermal state parameter comprising the aggregation of engine environment factors affecting the combustion heat release comprises determining an integrated thermal state parameter comprising an aggregation of engine environment factors affecting the combustion heat release indicated by a 50% mass-burn fraction.

12. A method for operating an internal combustion engine in a homogeneous-charge compression-ignition combustion mode, comprising:
   determining an integrated thermal state parameter comprising an aggregation of engine environment factors affecting a combustion heat release; and
   controlling operation of the internal combustion engine in a homogeneous-charge compression-ignition combustion mode to achieve a preferred combustion phasing responsive to an operator torque request and the integrated thermal state parameter comprising executing a feed-forward engine control scheme to determine states for engine control parameters associated with the preferred combustion phasing responsive to the operator torque request and the integrated thermal state parameter.

13. The method of claim 12, wherein determining the integrated thermal state parameter comprising the aggregation of engine environment factors affecting the combustion heat release comprises determining an integrated thermal state parameter comprising an aggregation of engine environment factors affecting the combustion heat release indicated by a 50% mass-burn fraction.

14. The method of claim 12, wherein determining the integrated thermal state parameter comprising the aggregation of engine environment factors affecting the combustion heat release comprising determining an integrated thermal state parameter comprising an aggregation of engine environment factors comprising engine load, intake air temperature, ambient humidity, altitude, fuel quality, and combustion chamber deposits.

\* \* \* \* \*